United States Patent
Mathieson

(10) Patent No.: US 7,019,863 B2
(45) Date of Patent: Mar. 28, 2006

(54) METHOD TO MOVE QUEUED DATA BACK TO THE NETWORK TO MAKE ROOM IN THE DEVICE TO COMPLETE OTHER JOBS

(75) Inventor: Rono James Mathieson, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 808 days.

(21) Appl. No.: 10/166,108

(22) Filed: Jun. 10, 2002

(65) Prior Publication Data

US 2003/0227651 A1    Dec. 11, 2003

(51) Int. Cl.
*G06F 13/00* (2006.01)
*G06F 15/00* (2006.01)

(52) U.S. Cl. .................... 358/1.16; 358/1.15; 358/1.17

(58) Field of Classification Search .............. 358/1.15, 358/1.16, 1.17
See application file for complete search history.

(56) References Cited

U.S. PATENT DOCUMENTS

| | | | |
|---|---|---|---|
| 4,947,345 A * | 8/1990 | Paradise et al. ............ 358/442 |
| 5,129,049 A | 7/1992 | Cuzzo et al. |
| 5,605,407 A | 2/1997 | Hama et al. |
| 5,623,668 A | 4/1997 | Nieuwenhuizen |
| 5,787,237 A | 7/1998 | Reilly |
| 5,873,659 A | 2/1999 | Edwards et al. |
| 5,923,826 A | 7/1999 | Grzenda et al. |
| 5,970,223 A | 10/1999 | Debes et al. |
| 5,970,224 A | 10/1999 | Salgado et al. |
| 5,978,559 A | 11/1999 | Quinion |
| 5,982,994 A | 11/1999 | Mori et al. |
| 5,995,721 A | 11/1999 | Rourke et al. |
| 6,145,031 A | 11/2000 | Mastie et al. |
| 6,189,047 B1 | 2/2001 | Ball |
| 6,237,079 B1 | 5/2001 | Stoney |
| 6,252,681 B1 | 6/2001 | Gusmano et al. |
| 6,301,012 B1 | 10/2001 | White et al. |
| 6,336,143 B1 | 1/2002 | Diedrich et al. |

FOREIGN PATENT DOCUMENTS

JP    08-202566    * 8/1996

* cited by examiner

*Primary Examiner*—Edward L. Coles
*Assistant Examiner*—Alan Rahimi
(74) *Attorney, Agent, or Firm*—Robert D. Varitz, PC

(57) ABSTRACT

A method of clearing an internal print queue in a print output device includes processing a print job in a print output device to make a processed print job; storing the processed print jobs in the internal print queue of a print output device; detecting an overload condition in the internal print queue; determining which processed print jobs are not ready to be physically printed; selecting at least one not ready to be printed processed print job in the internal print queue for transfer out of the internal print queue to clear the overload condition; moving the selected processed print job to a temporary storage print queue; and moving the selected processed print jobs from a temporary storage print queue to the internal print queue upon occurrence of a predetermined event.

21 Claims, 1 Drawing Sheet

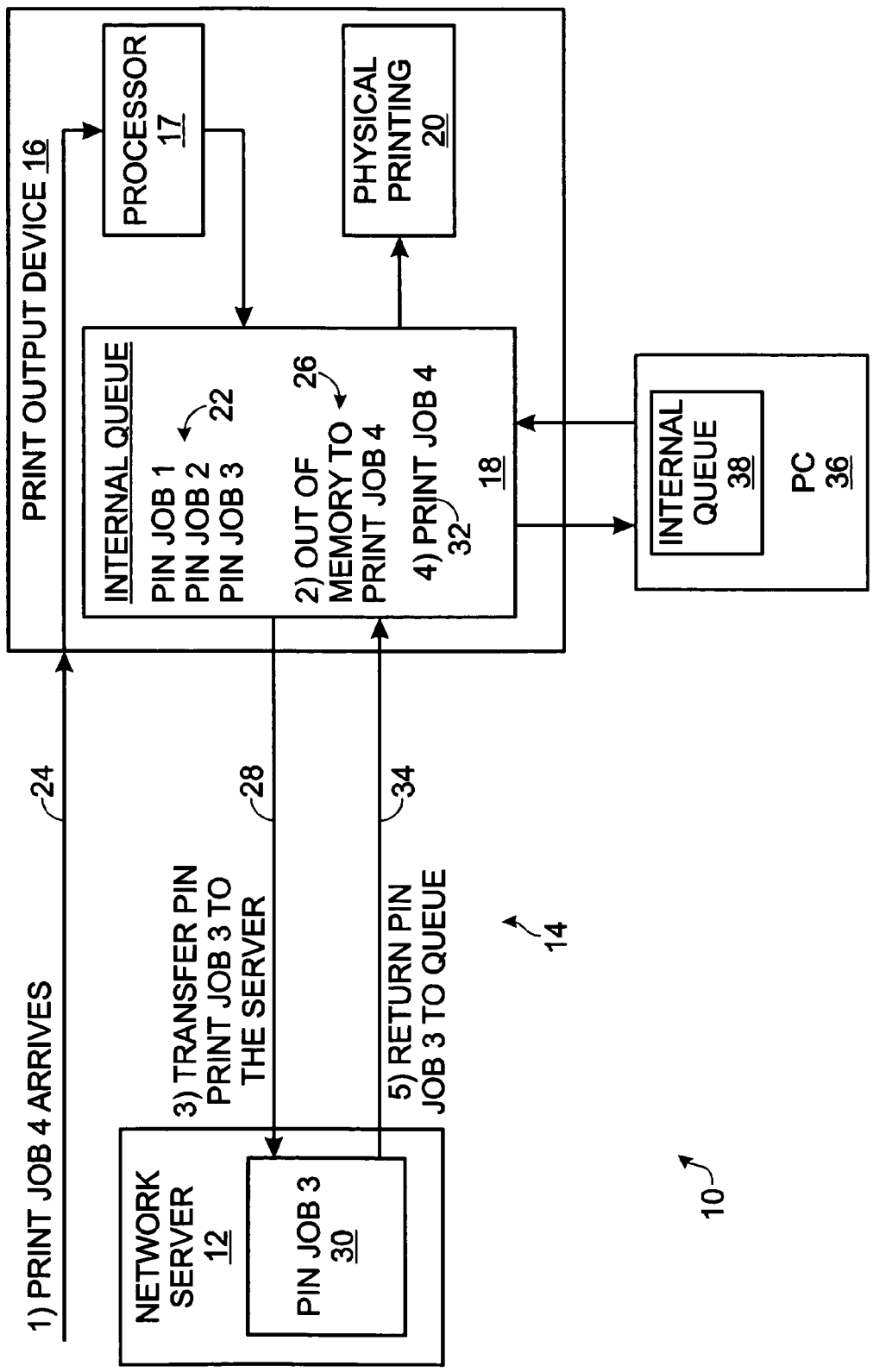

METHOD TO MOVE QUEUED DATA BACK TO THE NETWORK TO MAKE ROOM IN THE DEVICE TO COMPLETE OTHER JOBS

FIELD OF THE INVENTION

This invention relates to managing jobs, i.e., print or copy jobs, that are stored in the internal print queue of an multi-functional peripheral (MFP) or other print output device, e.g., copier, printer, scanner or facsimile machine. Specifically, managing those jobs in the case where insufficient memory exists in the print output device to process multiple jobs that are competing for the same resources.

BACKGROUND OF THE INVENTION

Today's digital printers and MFP's have the ability to accept one or more print jobs which may be queued into an internal print queue in the print output device. These may be printing, copying, scanning or facsimile jobs, and the jobs may come from a directly-connected computer, over a local area network, or over some other form of communications network, such as the Internet, or over conventional telephone lines. In devices which have limited memory, several conditions exist which can lead to jobs blocking one another, as they compete for available memory in the print output device. One condition occurs when a print job is being processed, e.g., rasterized, and stored to memory, or to an internal print queue, at the same time a copy job is being scanned and stored to memory or to an internal print queue. The available memory may be exhausted before either job has been fully stored, hence the jobs are blocked and neither can be physically output. A second condition occurs when memory is used for personal identification number (PIN) encoded print jobs which are processed and stored, and which require that the user come to the device and release the job for physical output by entering the appropriate PIN number. In this case, there may not be sufficient memory to accommodate processing of other jobs.

This invention provides a means of removing one or more blocking jobs from the print output device internal print queue and storing them onto a network server or PC temporarily so that other jobs may be processed. These jobs may then returned to the device queue once the blocking condition has ceased to exist, or when a PIN or other request for the processed print job is entered on the print output device.

In the prior art, this problem has been solved by placing larger memories in the device such as a hard disk.

U.S. Pat. No. 6,336,143 B1, to Diedrich et al., for Method and apparatus for multimedia data interchange with pacing capability in a distributed data processing system, granted Jan. 1, 2002, describes a system which directs multimedia content to a storage location as a function of the available memory at the storage location.

U.S. Pat. No. 6,301,012 B1, to White et al., for Automatic configuration of a network printer, granted Oct. 9, 2001, describes recognition of new network peripherals and interaction between a network server and any new peripherals.

U.S. Pat. No. 6,252,681 B1, to Gusmano et al., for Multifunctional printing system with queue management, granted Jun. 26, 2001, describes queue management for plural types of print jobs.

U.S. Pat. No. 6,237,079 B1, to Stoney, for Coprocessor interface having pending instructions queue and clean-up queue and dynamically allocating memory, granted May 22, 2001, describes the routing of different types of computer instructions to different coprocessors, specifically, the identification and differentiation of instructions intended for a CPU and at least one coprocessor.

U.S. Pat. No. 6,189,047 B1, to Ball, for Apparatus and method for monitoring event queue operations with pluggable event queues, granted Feb. 13, 2001, describes distribution of information into various queues.

U.S. Pat. No. 6,145,031, to Mastie et al., for Multiple insertion point queue to order and select elements to be processed, granted Nov. 7, 2000, describes prioritization and distribution of print jobs.

U.S. Pat. No. 5,995,721, to Rourke et al, for Distributed printing system, granted Nov. 30, 1999, describes a system which provides direction to print jobs to an appropriate print output device.

U.S. Pat. No. 5,982,994, to Mori et al., for Network printer apparatus and LAN network system, granted Nov. 9, 1999, describes a system which directs print jobs to a designated network printer, sorts jobs by user and job type, and which stores information relative to the print jobs.

U.S. Pat. No. 5,978,559, to Quinion, for User interface for distributed printing system, granted Nov. 2, 1999, describes a system for shifting print jobs between internal queues in a print output device dependent on memory conditions in the print queues.

U.S. Pat. No. 5,970,224, to Salgado et al., for Multifunctional printing system with queue management, granted Oct. 19, 1999, describes a system which handles various print job inputs and prioritizes same according to user preferences.

U.S. Pat. No. 5,970,223, to Debes et al., for Job interrupt system for multifunctional printing system, granted Oct. 19, 1999, describes a system for outputting higher priority print jobs by interrupting a print job in progress, and then completing the originally printing job.

U.S. Pat. No. 5,923,826, to Grzenda et al., for Copier/printer with print queue disposed remotely thereof, granted Jul. 13, 1999, describes digital print output devices connected to a network print server, wherein the print queue is located in the network server instead of in the various print output devices.

U.S. Pat. No. 5,873,659, to Edwards et al., for Method and apparatus for providing a printer having internal queue job management, granted Feb. 23, 1999, describes a printer having a sizable memory therein, which may be used to hold and print print jobs according to priority, and which may retain a "deleted" print job, allowing for the reinstatement of the print job.

U.S. Pat. No. Re 35,922, to Cuzzo et al., for Method and apparatus for preventing print overruns, granted Oct. 13, 1998, describes a rasterization technique which divides a page into segments, thus preventing overruns of a print queue and thereby speeding the printing process.

U.S. Pat. No. 5,787,237, to Reilly, for Uniform interface for conducting communications in a heterogeneous computing network, granted Jul. 28, 1998, describes a system having a hard drive in a print output device which features a FIFO print protocol.

U.S. Pat. No. 5,623,668, to Nieuwenhuizen, for Method in a polling system for transmitting queue elements form multiple input queues to a single output with improved queue service performance, granted Apr. 22, 1997, describes print job prioritization.

U.S. Pat. No. 5,605,407, to Hama et al., for Printer and its control method, granted Feb. 25, 1997, describes control of printer mechanisms.

SUMMARY OF THE INVENTION

A method of clearing an internal print queue in a print output device includes processing a print job in a print output device to make a processed print job; storing the processed print jobs in the internal print queue of a print output device; detecting an overload condition in the internal print queue; determining which processed print jobs are not ready to be physically printed; selecting at least one not ready to be printed processed print job in the internal print queue for transfer out of the internal print queue to clear the overload condition; moving the selected processed print job to a temporary storage print queue; and moving the selected processed print jobs from a temporary storage print queue to the internal print queue upon occurrence of a predetermined event.

It is an object of the invention to prevent loss of output information in the event that an internal print queue in an print output device becomes full.

Another object of the invention is to provide a method of temporarily moving rasterized print jobs which are not yet fully ready to be physically output to allow physical output of another print job.

A further object of the invention is to provided improved concurrent use of print output device functions.

Another object of the invention is to provided a means for processing print jobs as a function of assigned print job priority designations.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWING

FIG. 1 depicts the method of the invention.

DETAILED DESCRIPTION OF THE PREFERRED EMBODIMENT

This invention provides a means for removing print jobs from a print output device internal print queue which are blocking processing and printing of other print jobs directed to the print output device. In the prior art, the problem is simply solved by providing a larger memory on the device. The prior art solution requires the provision of a hard drive, and associated circuitry and software. In the method of the invention, the problem is solved by transferring the data to a network-connected server, or to a connected PC, where it may be held until the blocking condition has passed.

This invention provides for the automatic transfer of queued jobs to a server or PC for temporary storage when a blocking condition exists within the print output device. In the example of the method of the invention shown in FIG. 1, generally at 10, a network server 12 is connected over a communications network 14 to a print output device 16. Device 16 has a processor 17, which may be a rasterizing image processor, and an internal print queue 18, which receives a processed print job from processor 17. As used herein, "processing" includes rasterizing, or ripping, of a non-ready-to-print print job and whatever is necessary to physically print a print job which is ready-to-print, such as in the case of a *.tif file. A print engine 20 is also contained in device 16, and includes a paper handling mechanism and an image fixing mechanism.

The processor, paper handling mechanism and image fixing mechanism are well know to those of ordinary skill in the art. The method of the invention provides a technique for removing blocking print jobs, which are ready to be physically printed, from internal print queue 18, when other print jobs are ready to be processed, stored and printed in print output device 16. Blocking print job may be PIN encoded processed print jobs, which are waiting for a user to enter the PIN on the print output device, or partially processed print jobs, which have been interrupted by a higher priority print job, or by a request to an MFP to perform a different function, such as copy, scan or send/receive a facsimile.

As shown in FIG. 1, internal print queue 18 contains three print jobs 22, all of which are PIN encoded print jobs, which means that these jobs, although ready to be physically output by print engine 20, will be held in internal print queue 18 until the originator of the print jobs inputs a PIN into print output device 16. In this case, it is assumed that print jobs 22 fill the available queue memory, which does not allow print job 4 to be processed. When print job 4 arrives 24, either from the network or from a connected PC, it is processed, i.e., rasterized if necessary, or processed in whatever manner is necessary to make the print job ready for physical printing, however, as print jobs 22 occupy the available space in internal print queue 18, a blocking condition 26 exists because print job 4 cannot fully be stored in internal print queue 18, which results in an overload condition in internal print queue 18. It should be noted that print jobs may be sent to the print output device over a network or from a directly-connected PC. It is assumed that the print output device is connected to a network, either directly, or though a computer which connected to a network.

Print job 4 could be held in device 16 in processor 17 until a user arrives to retrieve one or more of the blocking PIN print jobs, however, such a protocol is inefficient, as the user may not come to the device for some time. In the method of the invention, one or more of the blocking PIN print jobs, print job 3 in this example, is transferred 28 to a designated network server, e.g., server 12, which is configured according to the method of the invention with a temporary storage print queue 30. Once this is done, print job 4 may be processed in a normal fashion. At this point, the method of the invention detects the availability of room in internal print queue 18 and automatically moves processed print job 3, the temporarily stored PIN print job, to print output device 16 internal print queue 18, step 34. In the case where a PC, such as PC 36, having a temporary storage print queue 38 therein, is connected to print output device 16, temporary storage print queue 38 may be used to store print job 3 until there is room in internal print queue 18.

Alternatively, once any processed or partially processed print jobs have been transferred to the temporary storage print queue, they may be retained in the network server or PC until such time as the print job user comes to retrieve them, or until an instruction is otherwise received to move the temporarily stored print job to internal print queue 18, to avoid constantly transferring print jobs between internal print queue 18 and server queue 30 or PC queue 38, thus freeing internal print queue 18 for other arriving print jobs. What causes a processed print job located in a temporary storage print queue to be transferred back to internal print queue 18 is the occurrence of a predetermined event. This event may be the automatic detection of room in internal print queue 18, the entry of a PIN by a user, or any other event which the system is directed to recognize as requiring the transfer of a processed print job from a temporary storage print queue to internal print queue 18.

Another scenario which may result in a blocking condition is the case where multiple jobs are being processed and stored in internal print queue 18. If a print job has been received, only partially processed, e.g., rasterized, and stored to internal print queue 18 in response to a request for a copy or scan job, which is also processed and stored to the internal print queue, a condition may be reached when neither job can fully be placed into internal print queue 18. In this case, the portion of the print job that has been stored in the internal print queue is transferred to the designated network server or PC for temporary storage until the copy job has completed. When the blocking condition no longer exists, the temporarily stored portion of the print job is returned to internal print queue 18, and processing of the remainder of the print job continues, until the print job is fully processed and stored in internal print queue 18, ready for output. Another technique for handling processing of print jobs is to continue with the processing, such as ripping, of a print job and then to store the processed print job on the temporary storage print queue.

In some instances, users are allowed to assign a priority to a print job, wherein higher priority print jobs will bump a lower priority print job out of processor 17. Assume that all print jobs in internal print queue 18 are fully processed and are waiting for some event to happen before they are printed. A high priority print job is received in print output device 16, however, processor 17 is busy, and internal print queue 18 is nearly full. Depending on system setting, this scenario will result in the partially processed print job being removed from processor 17 and stored in a temporary storage pint queue, to allow processing of the high priority print job. Once the high priority print job is processed, blocking jobs in internal print queue 18 will be moved to a temporary storage print queue as required to make room for the processed high priority print job, which is sent to print engine 20 for physical printing.

The temporary storage print queue may take a number of forms. The temporary storage print queue may simply be a portion of the conventional print queue located on a network server or PC, and a processed print job transferred to the temporary storage print queue is placed in the print stack. More likely, the temporary storage print queue is a special storage area in the network server or PC. Transfer protocols, such as FTP or similar, may be used to move the processed print jobs to a FTP temporary storage print queue in the network server or PC.

Thus, a method to move queued data back to a network temporary storage print queue to make room in a print output device internal print queue to complete other jobs has been disclosed. It will be appreciated that further variations and modifications thereof may be made within the scope of the invention as defined in the appended claims.

I claim:

1. A method of clearing an internal print queue in a print output device comprising:
    processing a print job in a print output device to make a processed print job;
    storing the processed print jobs in the internal print queue of a print output device;
    detecting an overload condition in the internal print queue;
    determining which processed print jobs are not ready to be physically printed;
    selecting at least one not ready to be printed processed print job in the internal print queue for transfer out of the internal print queue to clear the overload condition;
    moving the selected processed print job to a temporary storage print queue; and
    moving the selected processed print jobs from a temporary storage print queue to the internal print queue upon occurrence of a predetermined event.

2. The method of claim 1 wherein said selecting includes selecting at least one PIN encoded processed print job for transfer out of the internal print queue.

3. The method of claim 2 wherein said moving the selected processed print jobs from a temporary storage print queue to the internal print queue includes the predetermined event of entering a PIN at the print output device for the selected processed print job.

4. The method of claim 1 wherein said processing includes processing a high priority print job ahead of lower priority print jobs.

5. The method of claim 1 wherein said moving the selected processed print jobs from a temporary storage print queue to the internal print queue when the overload condition is cleared includes detecting when there is room in the internal print queue and automatically moving the selected processed print job when there is room for the selected processed print job in the internal print queue.

6. The method of claim 1 which further includes inputting print jobs into the print output device which are generated by computers, copiers, scanners, and facsimile machines.

7. The method of claim 1 wherein said storing includes storing portions of processed print jobs in the internal print queue, and wherein said selecting includes selecting portions of processed print jobs in the internal print queue for transfer out of the internal print queue to clear an overload condition.

8. The method of claim 1 wherein said moving the selected processed print job to a temporary storage print queue includes providing a temporary storage print queue in a network server.

9. The method of claim 1 wherein said moving the selected processed print job to a temporary storage print queue includes providing a temporary storage print queue in a connected PC.

10. A method of clearing an internal print queue in a print output device comprising:
    processing a print job in a print output device to make a processed print job;
    storing the processed print jobs in the internal print queue of a print output device;
    detecting an overload condition in the internal print queue;
    determining which processed print jobs are not ready to be physically printed;
    selecting at least one PIN encoded processed print job in the internal print queue for transfer out of the internal print queue to clear the overload condition;
    moving the selected PIN encoded processed print job to a temporary storage print queue; and
    moving the selected PIN encoded processed print jobs from a temporary storage print queue to the internal print queue upon entry of a PIN at the print output device for the selected PIN encoded processed print job.

11. The method of claim 10 wherein said moving the selected PIN encoded processed print jobs from a temporary storage print queue to the internal print queue when the overload condition is cleared includes detecting when there is room in the internal print queue and automatically moving the selected PIN encoded processed print job when there is room for the selected PIN encoded processed print job in the internal print queue.

12. The method of claim 10 which further includes inputting print jobs into the print output device which are generated by computers, copiers, scanners, and facsimile machines.

13. The method of claim 10 wherein said storing includes storing portions of processed PIN encoded print jobs in the internal print queue, and wherein said selecting includes selecting portions of PIN encoded processed print jobs in the internal print queue for transfer out of the internal print queue to clear an overload condition.

14. The method of claim 10 wherein said moving the selected PIN encoded processed print job to a temporary storage print queue includes providing a temporary storage print queue in a network server.

15. The method of claim 10 wherein said moving the selected processed PIN encoded print job to a temporary storage print queue includes providing a temporary storage print queue in a connected PC.

16. A method of clearing an internal print queue in a print output device comprising:
    processing a print job in a print output device to make a processed print job, including processing high priority print jobs ahead of low priority print jobs;
    storing the processed print jobs in the internal print queue of a print output device;
    detecting an overload condition in the internal print queue;
    determining which processed print jobs are not ready to be physically printed;
    selecting at least one not ready to be printed processed low priority print job in the internal print queue for transfer out of the internal print queue to clear the overload condition;
    moving the selected processed low priority print job to a temporary storage print queue; and
    moving the selected processed low priority print jobs from a temporary storage print queue to the internal print queue upon occurrence of a predetermined event.

17. The method of claim 16 wherein said moving the selected processed low priority print jobs from a temporary storage print queue to the internal print queue when the overload condition is cleared includes detecting when there is room in the internal print queue and automatically moving the selected processed low priority print job when there is room for the selected processed low priority print job in the internal print queue.

18. The method of claim 16 which further includes inputting print jobs into the print output device which are generated by computers, copiers, scanners, and facsimile machines.

19. The method of claim 16 wherein said storing includes storing portions of processed print jobs in the internal print queue, and wherein said selecting includes selecting portions of processed print jobs in the internal print queue for transfer out of the internal print queue to clear an overload condition.

20. The method of claim 16 wherein said moving the selected processed low priority print job to a temporary storage print queue includes providing a temporary storage print queue in a network server.

21. The method of claim 16 wherein said moving the selected processed low priority print job to a temporary storage print queue includes providing a temporary storage print queue in a connected PC.

* * * * *